United States Patent
Bate et al.

[11] Patent Number: 6,133,359
[45] Date of Patent: Oct. 17, 2000

[54] NON-STICK COATINGS

[75] Inventors: Thomas James Bate; Hugh Campbell Wilson, both of Widnes, United Kingdom

[73] Assignee: Whitford Plastics Limited, Cheshire, United Kingdom

[21] Appl. No.: 08/001,192

[22] Filed: Jan. 7, 1993

[30] Foreign Application Priority Data

Jan. 7, 1992 [GB] United Kingdom .................. 9200181

[51] Int. Cl.⁷ ............... C08K 7/20; C08K 7/06; C08J 5/16; C08L 27/18
[52] U.S. Cl. .......... 524/430; 524/431; 523/141; 523/145
[58] Field of Search ................. 524/430, 431; 523/141, 145

[56] References Cited

U.S. PATENT DOCUMENTS

| | | | |
|---|---|---|---|
| 3,986,993 | 10/1976 | Vassilieu | 524/493 |
| 4,248,763 | 2/1981 | Yoshimura et al. | 524/496 |
| 5,180,759 | 1/1993 | Neu et al. | 524/430 |
| 5,194,484 | 3/1993 | Logothetis | 524/496 |

FOREIGN PATENT DOCUMENTS

| | | | |
|---|---|---|---|
| 681 045 | 11/1966 | Belgium . | |
| 1011168 | 1/1989 | Japan | 524/430 |
| 1118560 | 5/1989 | Japan | 524/430 |
| 1558932 | 4/1990 | U.S.S.R. | 524/430 |
| 1092014 | 11/1967 | United Kingdom . | |

OTHER PUBLICATIONS

Patent Abstracts of Japan (M–661), Abstract of JP 62–180111, Aug. 7, 1987.

Chemical Abstracts, vol. 74., No. 26., Jun. 28, 1971, Columbus, Ohio, US, Abstract No. 143431, "Water—dispersible polytetrafluorethylene coating compositions," p. 77, col. R.

*Primary Examiner*—James J. Seidleck
*Assistant Examiner*—Olga Asinovsky
*Attorney, Agent, or Firm*—Patterson & Keough, P.A.

[57] ABSTRACT

A non-stick coating composition comprising fluorocarbon resins and from 5 to 25% by weight of refractory fibers. The composition preferably additionally includes a liquid medium in which the fibers are dispersed and the fluorocarbon is dispersed. The composition is then applied, the liquid medium driven off and the fluorocarbon resin cured.

35 Claims, No Drawings

NON-STICK COATINGS

The present invention relates to non-stick coatings, particularly for cookware, though this invention is also applicable to other coated articles such as domestic and industrial tools and appliances.

Conventionally, non-stick coatings have included a fluorocarbon layer such as PTFE (polytetrafluoroethylene) applied directly to a metal substrate. This has been achieved for example by roll bonding the coating either as a sheet or powder, or by a solvent bonding process. In the latter, the coating material is applied as a solution or dispersion, the solvent is driven off and the coating is then cured.

Such coatings however tend to degrade with use and in some instances, the coating material flakes away from the substrate.

Higher quality coatings have been obtained by initially applying a basecoat to a roughened substrate and then applying a fluorocarbon rich topcoat to the basecoat. The solvents used in these systems are evaporated at relatively low temperatures prior to curing at about 400° C. While such coatings have improved adherence, the surfaces are still rather soft and therefore prone to damage by abrasion.

It is an object of the present invention to provide a non-stick coating which has improved resistance to wear and abrasion.

According to the present invention, a coating composition for providing a non-stick coating comprises one or more fluorocarbon resins, fibres such as refractory fibres and optionally a liquid medium. The fibres and the fluorocarbon are preferably dispersed in the medium. The composition may also include one or more binder resins such as polyamide-imide (PAI), polyphenylene sulphide (PPS), polyether sulphone (PES) or a silicone and possibly also pigments.

The fibres may represents 5 to 25% by weight of the dry final coating, preferably 7.5 to 20%, for example 10%. (This is approximately equivalent respectively to 2 to 10%, 3 to 8% and 4% by weight of the wet coating composition). The fluorocarbon may represent 40 to 90% by weight of the dry final coating, preferably 60 to 70%, for example 65%. Where a liquid medium is employed, this may be present as 40 g to 80 g, based on 100 g of the wet coating formulation as applied, preferably 50 g to 70 g, for example, 54.5 g. Where other components are included, they may represent 10 to 30% by weight of the final coating, preferably 15 to 25% for example 22%.

The fibres are preferably alumina fibres, however, carbon fibres, glass fibres, and similar materials may be used. The fibres as supplied may have diameters in the range 1 to 20 $\mu$m, preferably in the range 1 to 5 $\mu$m. Their lengths generally vary between 70 and 150 $\mu$m. However, fibres having a length to diameter ratio between 5:1 and 20:1 can also be used.

Suitable fluorocarbons may include PTFE (Polytetrafluoroethylene), FEP (Fluorinated Ethylene Propylene), PFA (Perfluoroalkoxy) though the preferred materials are PTFE and PFA, particularly PTFE.

The coating is preferably applied using a liquid medium. Suitable liquid mediums include blends of Water, aromatic hydrocarbons NMP (N-Methyl Pyrrolidone), DMF (Dimethyl formamide) Glycols, and Alcohols, though the preferred materials are blends of Water, Alcohols, NMP (N-MethylPyrrolidone) and Glycols. The coating may be applied by spray, roller or coil coating techniques or alternatively, the coating may be applied using a powder coating technique. The thickness of the coating may vary between 20 and 50 $\mu$m, but is preferably 30–35 $\mu$m.

The substrate material is preferably steel (including stainless steel) or aluminium, though other materials such as copper, glass or ceramics may be used, particularly when articles other than cookware are to be coated. In some cases, when liquid medium coating methods are used, the substrate is coated while flat and is subsequently shaped, although the coating of preformed articles can be undertaken.

The invention is particularly suitable in the case of multi-layer coatings, especially two-layer coatings. One or more of the coating layers may be in accordance with the invention. In a particularly preferred form, a basecoat would include a fibre content of 1 to 20% by weight of its final dry composition, preferably 7.7%, while a topcoat would include a fibre content of up to 10% by weight of its final composition, preferably about 1% to 10%, particularly about 1%.

The thickness of the basecoat may vary between 15 and 30 $\mu$m, and is preferably between 20 and 30 $\mu$m, for example 25 $\mu$m. The thickness of the topcoat may vary between 10 and 20 $\mu$m, and is preferably between 10 and 15 $\mu$m, for example 15 $\mu$m.

The invention therefore also extends to an article coated using a composition as defined above, or in its broadest sense an article having a non-stick coating comprising a fluorocarbon and refractory fibres.

According to another aspect of the invention, a method of applying a non-stick coating to an article comprising dispersing refractory fibres and dispersing or dissolving a fluorocarbon in a liquid medium to form a "wet" coating composition, applying the wet composition to the article, driving off the liquid medium to leave a "dry" coating, and curing the coating at an elevated temperature to provide a cured coating.

In the case of a multi-layer coating each layer is preferably dried before the next layer is applied. The curing of the various layers may be conducted separately or simultaneously.

The drying step may be carried out at a temperature in the range of 50° C. to 100° C., preferably at about 80° C. The time taken may vary between 2 and 20 mins, though typically may take about 5 mins, though this is dependent upon the power of the oven. The pressure may be between 700 and 800 mm Hg (93 and 107 kPa), but is preferably 760 mm of Hg (101 kPa).

The curing step may be carried out at a temperature in the range of 370° C. to 450° C., preferably 390° C. to 420° C., for example 400° C. The time taken at peak metal temperature may vary between 5 and 20 minutes, preferably 5 to 10 minutes, for example 5 mins. The pressure may be between 700 and 800 (93 and 107 kPa), but is preferably about 760 mm Hg (101 kPa). The curing step may be conducted under an atmosphere of air.

Preferably, prior to coating, the substrate to be coated is prepared in order to remove all contaminants such as oil, grease, detergent, blast media etc. Oils and greases may be removed by vapour degreasing, for example, using a chlorinated or fluorinated cleaning solvent. Alternatively, oils and greases may be removed by an alkali wash or by high temperature "burn-out" in which the substrates may be exposed to a pre-bake at 420° C. to 450° C. for 15 minutes. Preferably, the surfaces are also abraded, for example, by grit blasting. Suitable grits include iron-free aluminium oxide grit of 40 to 60 mesh (250 to 375 $\mu$m), using an air pressure of 100 psi (689 kPa) to a blast profile of 10 to 15 $\mu$m. All blast media should then be cleaned from the substrate prior to coating.

In the case of cast aluminium, it is possible that the metal may retain some contaminants from the casting process which might not be removed by grit blasting or degreasing. In such a case, high temperature "burn-out" is recommended to be employed prior to degreasing and grit blasting.

It has been found that coatings in accordance with the invention have improved resistance to abrasion at high temperatures and also improved resistance to staining, while no degradation in adherence has been experienced.

The invention may be carried into practice in various ways and will now be illustrated in the following examples.

EXAMPLE 1

The following basecoat composition was assembled.

| Component | % by Weight |
|---|---|
| PTFE dispersion (FLUON GP1) | 45.00 |
| Polyamide Imide (SMD 2204) | 19.54 |
| Deionised Water | 19.44 |
| Aluminium fibres (SAFFIL RF 590 150 M "W") | 7.14 |
| PFA dispersion (HOSTAFLON TFA VP6900) | 2.50 |
| Black Pigment | 4.75 |
| Wetting agents etc. | 1.63 |

The materials, at room temperature, were paddle mixed gently with a maximum speed of 100 rpm to eliminate any settling. The mixture was passed though a 100 $\mu$m sieve.

A pressed aluminium substrate was vapour degreased using a conventional chlorinated cleaning solvent. The substrate was abraded by gritblasting using a 40 to 60 mesh aluminium oxide grit at an air pressure of 100 psi (689 kPa) to an average blast profile (Ra) of 6 $\mu$m. The substrate was then cleaned of all blast media using conventional techniques.

The coating material was applied to the substrate as a base coat using a Binks model 630 spray gun equipped with a 1.8 mm fluid nozzle and an air nozzle adapted to use 13 cu. ft. (0.37 $m^3$) of air per minute at 30 psi (206 kPa). The base coat was applied uniformly over the substrate by spraying with a steady even motion. After the base coat had been applied to the required wet film thickness (70 to 90 $\mu$m wet), the solvents, including water, were flashed off at a temperature of 80 to 100° C. and the coated substrate was allowed to cool.

EXAMPLE 2

A top coat formulation was assembled using the following components:

| Component | % by weight (dry) | % by weight (wet) |
|---|---|---|
| Silicone resin | 7.40 | 3.30 |
| Organic Solvent | | 6.60 |
| Deionised water | | 16.91 |
| Alumina fibers | 2.20 | 0.99 |
| Glycol | | 1.98 |
| Wetting agents | | 2.29 |
| PTFE dispersion | 83.20 | 61.49 |
| PFA dispersion | 7.20 | 6.44 |

The top coat composition was prepared in the same way as in Example 1 and was applied to the cooled base coat in a similar way but to a thickness of 150 $\mu$m wet. The solvents including water were flashed off at a temperature of 80 to 100° C., for about 10 minutes.

The substrate with its two layer coating was then cured for 5 minutes at 400° C. (though in fact, a maximum cure of 5 minutes at 420° C. or a minimum cure of 4 minutes at 400° C. would have been sufficient). These temperatures represent the peak metal surface temperatures.

The resultant product included a base coat of 21 $\mu$m in thickness and a top coat of 11 $\mu$m, The coating had a smooth, semi-gloss finish. Testing showed a practical operating temperature range of −20° C. to 290° C.

We claim:

1. A coating composition for providing a non-stick coating which comprises refractory fibres mixed with at least one fluorocarbon resin, wherein said refractory fibres represent 1 to 25% by weight of a final coating derived from said composition and said refractory fibres have diameters in the range of about 1 $\mu$m to 20 $\mu$m and lengths in the range of about 70 $\mu$m to 150 $\mu$m, and wherein said at least one fluorocarbon resin represents 40 to 90% by weight of said final coating, wherein said final coating is adapted to be a non-stick coating.

2. A coating formulation for providing a non-stick coating on a substrate, said coating formulation comprising: a liquid medium present at about 40 to 60% by weight of said coating formulation; refractory fibres dispersed in said liquid medium, said refractory fibres representing about 1 to 25% by weight of a final coating derived from said formulation, said refractory fibres having a diameters in the range of about 1 $\mu$m to 20 $\mu$m and having lengths in the range of about 70 $\mu$m to 150 $\mu$m; a fluorocarbon resin, said fluorocarbon resin being at least one fluorocarbon resin dispersed or dissolved in said liquid medium selected from the group consisting of polytertrafluoroethylene, fluorinated ethylene propylene, perfluoralkoxy and combination thereof, said fluorocarbon representing about 40 to 90% by weight of said final coating.

3. A coating formulation for providing a non-stick coating on a metal substrate for the manufacture of cookware, said coating formulation comprising: a liquid medium present as about 40 to 60% by weight of said coating formulation, said liquid medium being selected from the group consisting of water, xylene, toluene, N-methyl pyrrolidine, dimethyl formamide, glycol and alcohol, refractory fibres dispersed in said liquid medium, said refractory fibres representing about 1 to 25% by weight of a final coating derived from said formulation, said refractory fibres being selected from the group consisting of aluminum fibres, glass fibres and carbon fibres; said refractory fibres having diameters in the range of about 1 $\mu$m to 20 $\mu$m and having lengths in the range of about 70 $\mu$m to 150 $\mu$m; and at least one fluorocarbon resin dispersed or dissolved in said liquid medium, said fluorocarbon resin being selected from the group consisting of polytertrafluoroethylene, fluorinated ethylene propylene, perfluoryalkoxy and combination thereof, said fluorocarbon representing about 40 to 90% by weight of said final coating.

4. A composition according to claim 1 said composition additionally including a liquid medium.

5. A composition according to claim 4 wherein said fibres are dispersed in said liquid and said at least one fluorocarbon resin is also dispersed.

6. A composition according to claim 4 said composition additionally including a binder resin.

7. A composition according to claim 6, wherein said binder resin is a polyamide imide.

8. A composition according to claim 1 wherein said fibres represent 8 to 16% by weight of said final dry coating.

9. A composition according to claim 1 wherein said at least fluorocarbon resin represents 60 to 70% by weight of said final dry coating.

10. A composition according to claim 4 wherein said liquid medium is present as 40 to 60 g based on 100 g of said coating formulation.

11. A composition according to claim 10 wherein said liquid medium is present as 50 to 55 g based on 100 g of said coating formulation.

12. A composition according to claim 1 wherein said fibres are selected from the group consisting of alumina fibres, carbon fibres and glass fibres.

13. A composition according to claim 1 wherein said at least one fluorocarbon resin is selected from the group consisting of PTFE (polytetrafluoroethylene), FEP (fluorinated ethylene propylene), PFA (Perfluoroalkoxy) and combinations thereof.

14. A composition according to claim 4 wherein said liquid medium is selected from the group consisting of a blend of some or all of water, xylene, Toluene, MNP (N-methyl pyrrolidone), DMF (Di-methyl formamide), Glycol and Alcohol.

15. A method of applying a non-stick coating to a substrate which comprises dispersing refractory fibres and a fluorocarbon in a liquid medium to form a wet coating composition, applying said wet coating composition to said substrate, driving off said liquid medium to leave a dry coating, and curing said dry coating at an elevated temperature to provide a cured coating, said fibres representing 1 to 25% by weight of said coating, said refractory fibres having diameters in the range of about 1 μm to 20 μm and lengths in the range of about 70 μm to 150 μm and said fluorocarbon representing 40 to 90% by weight of said coating.

16. A method according to claim 15 wherein said drying step is carried out at a temperature in the range of 20 to 100° C. for a time between 2 and 20 minutes.

17. A method according to claim 15 wherein said curing step is carried out at a temperature in the range of 370 to 450° C. for a time between 5 and 20 minutes.

18. A method according to claim 15 wherein said prior to coating, said substrate is treated to remove contaminants.

19. A method according to claim 18 wherein said substrate is subjected to a temperature of 420 t 450° C. to remove contaminants.

20. A method according to claim 15 wherein said substrate is selected from the group consisting of steel, aluminium, copper, glass and ceramic.

21. A method according to claim 15 wherein a plurality of layers of coating are applied to said substrate.

22. A non-stick coating comprising a film of thickness up to about 50 μm, said film comprising at least one fluorocarbon resin and refractory fibres, said refractory fibres having diameters in the range of about 1 μm to 20 μm and lengths in the range of about 70 μm to 150 μm.

23. A cooking article comprising a substrate and non-stick coating, said non-stick coating comprising a film of thickness up to about 50 microns, said film comprising at least one fluorocarbon resin and fibres.

24. A method according to claim 15, wherein said coating composition additionally includes a binder resin.

25. A method according to claim 24, wherein said binder resin comprises one or more of polyamide imide, polyphenylene sulphide, polyether sulphone and silicone resins.

26. A composition according to claim 6, wherein said binder resin comprises one or more of polyamide imide, polyphenylene sulphide, polyether sulphone and silicone resins.

27. A coating formulation according to claim 2, wherein said coating formulation additionally includes a binder resin.

28. A coating formulation according to claim 27, wherein said binder resin comprises one or more of polyamide imide, polyphenylene sulphide, polyether sulphone and silicone resins.

29. A coating formulation according to claim 3, wherein said coating formulation additionally includes a binder resin.

30. A coating formulation according to claim 29, wherein said binder resin comprises one or more of polyamide imide, polyphenylene sulphide, polyether sulphone and silicone resins.

31. A non-stick coating according to claim 22, wherein said coating additionally includes a binder resin.

32. A non-stick coating according to claim 31, wherein said binder resin comprises one or more of polyamide imide, polyphenylene sulphide, polyether sulphone and silicone resins.

33. A cooking article according to claim 23, said fibres having diameters in the range of about 1 μm to 20 μm and lengths in the range of about 70 μm to 150 μm.

34. A cooking article according to claim 23, wherein said coating additionally includes a binder resin.

35. A cooking article according to claim 34, wherein said binder resin comprises one or more of polyamide imide, polyphenylene sulphide, polyether sulphone and silicone resins.

* * * * *